United States Patent
Johnson

[15] 3,653,421
[45] Apr. 4, 1972

[54] TIRE, BEAD BUFFER IN COMBINATION WITH RIM ADAPTORS

[72] Inventor: Tilden William Johnson, 5630 Sawtelle Blvd., Culver City, Calif. 90230

[22] Filed: June 16, 1969

[21] Appl. No.: 834,244

[52] U.S. Cl.............................................152/158, 152/400
[51] Int. Cl.......................................................B60c 17/04
[58] Field of Search...................................152/158, 399, 400

[56] References Cited

UNITED STATES PATENTS

| | | | |
|---|---|---|---|
| 2,989,108 | 5/1961 | Gore | 152/158 |
| 3,435,872 | 4/1901 | Johnson | 152/158 |
| 542,683 | 7/1895 | Nase | 152/400 |

FOREIGN PATENTS OR APPLICATIONS

| | | | |
|---|---|---|---|
| 1,176,013 | 8/1964 | Germany | 152/158 |

*Primary Examiner*—Arthur L. La Point
*Assistant Examiner*—George H. Libman

[57] ABSTRACT

A flexible Buffer for tubeless tires upon loss of air capable of stiffening a tire bead against dirt wedging and swerve sidewall pressure, the buffer base sufficiently narrow to leave enough of the rim drop center open for last tire bead mounting, said buffer attachable to the rim for rim projections in some species and some species attaches to the rim by buffer reinforcing extending under the tire bead, one specie having a lateral extending in shear addition between which addition and basic buffer a novel air shield containing a tube with an air valve, sidewall resembling beads can be secured forming an economical and efficient air cap to said buffer, providing tubeless tire cool running and solid tire assurance, combined with economy of manufacture and ease of installation.

12 Claims, 4 Drawing Figures

Patented April 4, 1972
3,653,421
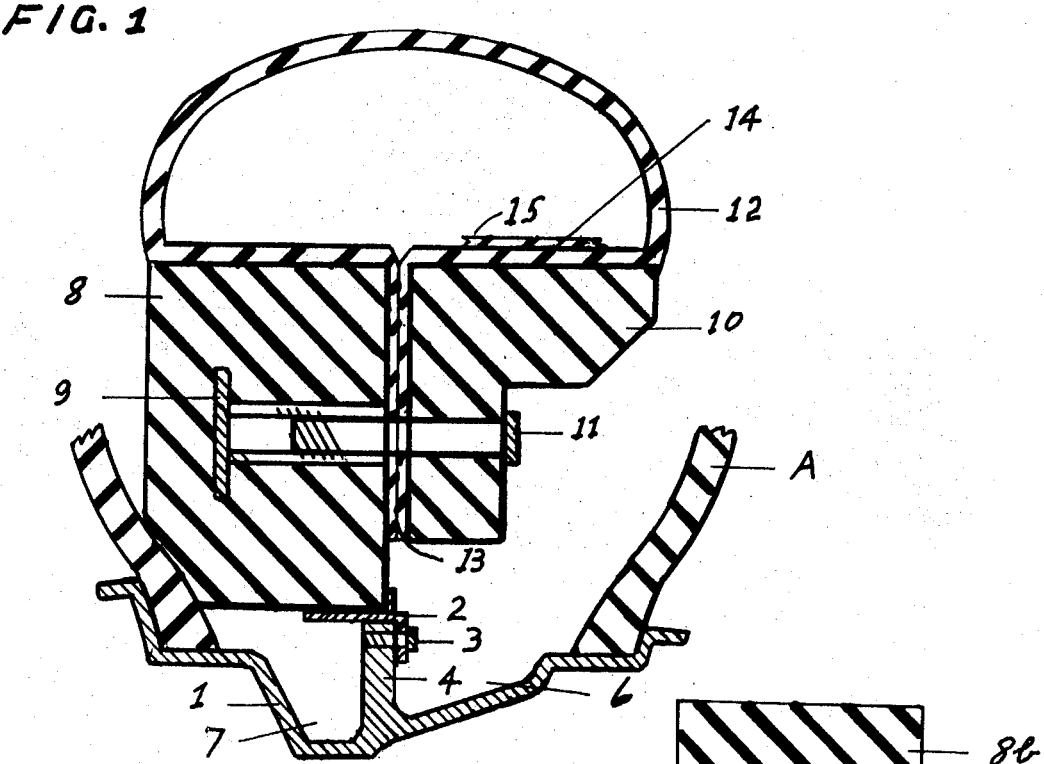
FIG. 1
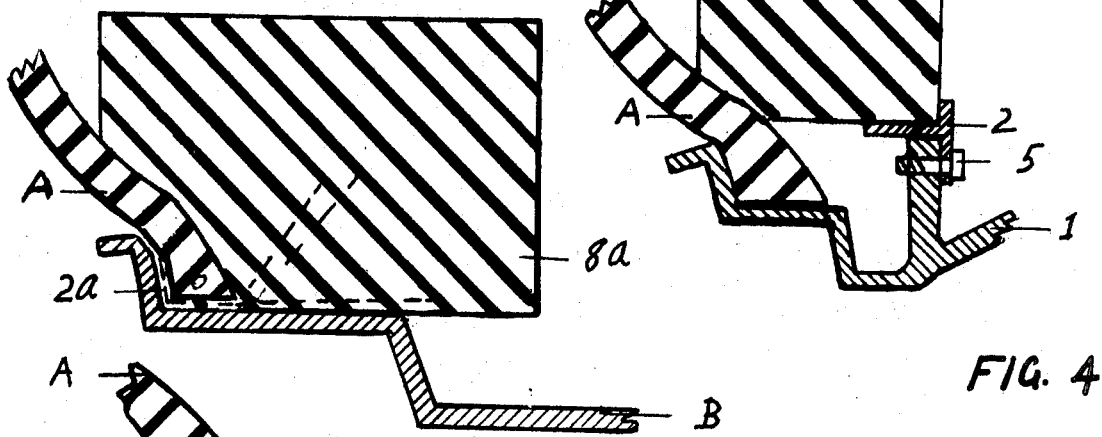
FIG. 2
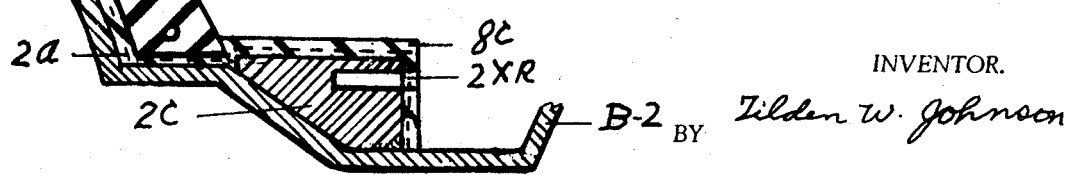
FIG. 3
FIG. 4
INVENTOR.
BY Tilden W. Johnson

TIRE, BEAD BUFFER IN COMBINATION WITH RIM ADAPTORS

The invention is an improvement discovered while testing current copending U.S. Pat. No. 3,435,872 (Ser. No. 620,206). "A Safety Wheel Rim and Buffer Therefor," a continuation from prior U.S. Pat. No. 3,282,321. U.S. Pat. No. 3,435,872 continued a concept in U.S. Pat. No. 3,282,321, one sheet of drawing in U.S. Pat. No. 3,282,321 is still unused, and not abandoned.

The preferred specie set forth herein is that most adaptable to the type of load, automobile and class of rims available for buffer use.

Current (year 1969) manufactured in volume automobile rims, prior to this invention, have a factor of safety weakness in that tubeless tires installed thereon on rims being manufactured in volume have a factor of safety of perhaps less than one against severe emergency road maneuvering, road projections and dirt wedging a tubeless tire from the rim. This is especially true when localized pressure is encountered at a tire spot near the rim as occurs when a rock or clay is jammed between the tire and rim.

Further said 1969 automobile rims being manufactured in quantities are having mounting and dismounting difficulties as safety regulations require the drop centers be made shallower to prevent flat tires rolling off the rims. However the tire beads in 1969 rims can drop into the drop center causing dangerous tire flip flop, producing wrecks and injuries. Further older drop center rims are not up to high safety requirements as the tires can and do roll off of the rims before the car can stop if air is lost.

In addition to the aforesaid unsolved wheel problems, prior to this invention, tubeless tires are increasing in size and height and wheel drop. This condition is increasing the necessity to use tire buffering devices to prevent wheel drop and car upsets upon loss of tire air.

Therefore, it is the object and purpose of this invention to set forth a novel construction and combination useable on practically all rims that will solve the foregoing wheel problems and make the use of inner buffers, to increase the factor of safety of pneumatic wheels, more feasible and economical than heretofore. To achieve this object it is necessary to discover as the inventor did when his tubeless tire car rolled following dirt wedging from the rim, the lack of factor of safety of tubeless tires and the need for this development and the fact that rubber, contrary to popular belief, is really just distortable in shape to vary its height and not compressible as generally believed. For example when enclosed in an object like a pipe, rubber is as incompressible almost as water, and water is less compressible than iron.

In order for rubber buffers to yield to road loads and shock loads, the rubber must have space in which to distort its shape. Further high shore rubber can be manufactured as hard as a board. Experiments show that a rubber solid tire when encountering road loads and shock loads can best function when the rubber buffer yields through shear or bending. Therefore this invention utilizes shear and locates the buffer in one specie by bolting it to a drop center rim dividing projection and the tire bead and sidewall over the exposed side of the wheel rim, i.e. the side against which swerve pressure occurs as in FIGS. 1 and 4 while another specie utilizes shear by rim attachment by means of air shield type reinforcements imbedded in the buffer and extending under the bead of the inflated tubeless tire and the buffer shears as part extends over the rim drop center as in FIG. 2. FIGS. 1 and 4 show how the buffer attaches to one specie of the now aluminum cast rim shown in my U.S. Pat. No. 3,435,872 that patent's FIG. 3. FIGS. 2 and 3 designated "B" herein show how the reinforcement under the tire bead type fits on standard types of 1969 volume produced rims. Of course these rims only illustrate the buffer and are not part of this invention unless claimed in combination with the buffer.

Experiments shown better wheel functioning and less enclosing tire wear occurs when the buffer cap bears a pneumatic air shield, and one specie of this invention sets forth a novel construction and combination for utilizing a novel type of air shield on the buffer cap, all adding up to several species.

Fortunately the possibility of discovered use of shear to support buffer load and locating the buffer on just one side of the rim at its base, makes it possible for the invention to leave half or more of the drop center open for installation of the last tire bead after the buffer has been installed. Using the reinforced type where the reinforcement extends under the tire beads makes the buffer useable on the some 300,000,000 drop center rims now on cars in 1969. Thus first inflating the tire to seat one tire bead and then removing the remaining bead and installing the buffer and then mounting the removed bead and inflating again only takes an additional minute or so and is no problem.

Other objects and advantages of the invention will become apparent in the following description of the invention, taken in connection with the accompanying drawings in which:

FIG. 1 is a transverse sectional view of the left front wheel as viewed from the driver's seat with the enclosing tubeless tire not part of the invention unless in combination indicated by fragments of the tire sidewall and beads. This represents the most combined and fully developed specie of the invention. Item 8 without the threaded bushing 9 is the basic buffer. (See FIG. 4). The rim shown is the aluminum cast version of one specie of the rims in U.S. Pat. No. 3,435,872 and not part of this invention unless in combination.

FIG. 2 is a fragmented sectional view of the buffer specie secured to a 1969 car rim on cars in 1969 by an air shield type reinforcement imbedded in the buffer and extending under the inflated tire bead as shown.

FIG. 3 is a fragmented sectional view indicating the specie shown in FIG. 2 can come in two parts if necessary to fit the buffer to some rims now on cars in 1969. It consists of reinforced flexible material in which are imbedded metal with threaded holes to provide attachment of basic buffer.

FIG. 4 is a fragmented sectional view of the basic buffer mounted on the rim in FIG. 1 which is one specie of the rim shown in FIG. 3 of my U.S. Pat. No. 3,435,872.

Referring more particularly to the drawings by letters and numbers:

The letter "A" indicates the enclosing tubeless tire and is no part of this invention unless claimed in combination with the invention.

The letters "B" and "B-2" are current 1969 rim configurations on 1969 cars used for illustration and not part of the invention unless claimed in combination with the invention.

1 represents the aluminum cast rim version of U.S. Pat. No. 3,435,872 specie.

2 represents an attachment device used with rim 1.

3 represents an attaching bolt.

4 represents the dividing projection in the drop center rim 1.

5 represents a bolt.

6 represents for discussion the minor drop center in rim 1.

7 represents the major drop center in rim 1.

8 represents the basic buffer as illustrated in 8b FIG. 4 8a and 8c are species of 8.

9 represents a tapped bushing embedded in 8, FIG. 1.

10 represents an attachable buffer cap flange addition extending in shear.

11 represents a bolt to attach 10 to 8 and in some species to attach the air shield 12.

12 represents a pneumatic air shield over cap of buffer, FIG. 1.

13 represents novel air shield tire beads resembling tire walls.

14 represents a tube to contain air.

15 represents an air valve is included on tube 14.

2a represents the reinforcements imbedded in 8 and 8a and 8c extending under the inflated tire bead as in FIGS. 2 and 3.

2c represents metal imbedded in item 8c.

2xr represents a threaded hole in item 2c in 8c to engage a bolt holding any attachment thereto.

The basic buffer 8 in FIG. 1 without the threaded bushing 9 looks somewhat like 8b in FIG. 4. The claims use the expression a flexible buffer to indicate any flexible material may be used, though rubber is principally used at this time. It will have a shore hardness as the class of use demands and may have any type of reinforcements now known on which patents have run on rights secured. Mounting item 8 in the rim and within the enclosing tire requires a flexibility sufficient to pass in the enclosure. In my patented rim as item 1 shown in FIGS. 1 and 4 the low flange and minor drop center facilitates loading as it passes over the flange and is the right size to bolt to the projection between the minor and major drop center. The specie in FIG. 2, item 8a, in order to load into standard rims now used and on 1969 automobiles, must have more flexibility and stretchability to stretch over the rim flanges than item 8 specie or it must come in two sections as indicated in FIG. 3 item 8c whereby item 8c can be as high as the projection 4 in rim 1 and then 8 can attach thereto as 8 attaches to item 4 in illustration rim 1. If an enlarged version of 8 is desired without a capping air shield, item 10 can be made integral with 8 as another specie or items 8 and 10 attached together and installed as a single unit. It is not difficult to pass a buffer of the size indicated into a tire and on a rim when it is considered first the one bead is located by regular air inflation and when the remaining bead can be stretched open from the seated bead to many inches, many more than the viewer realizes until he tries it. Items 9 and 11 are standard hardware or easily manufactured items by threaded bushing and bolt establishments.

Items 8 and 10 when of rubber or some synthetics, note the claims use the word flexible, for both, are producable economically in volume by die casting. Item 12 the air shield can be shaped and reinforced as usual air shields by air shield manufacturers or by skilled personnel with the normal machinery usual to that type manufacture.

The advantages of using buffers as herein over tires within tires or tubes or air shields of the tire type is the rim surface remains accessable to the air enclosed and heated by tire flexing especially at high speed. The iron rim can conduct heat from heated enclosing tire air 300 times faster than the tire fabric can, and friction between tire and an enclosing tube is eliminated; thus tubeless tires run cooler and therefore get more mileage than tube type tires where the tube contacts the tire, and heat melting the rubber on the road is eliminated by using tubeless tires in a substantial degree. The buffer makes total loss of use and great wheel drop much less and gives peace of mind to the driver, and the buffer holds the tire bead against dirt and swerve wedging.

The buffer eliminated the usual flip flop of deflated tires. When the rim is aluminum cast or forged, the aluminum conducts heat from the heated air 3 to 5 times faster than iron.

Finally the buffer as set forth lends itself to mass production by die casting with a better product and less expense per unit, and the method shown of assembling and demounting and mounting allows great ease of installation, thus increasing the use of buffers generally which will make automobiles safer on the highways to the owner and all automobiles he encounters thereon and their drivers.

From the foregoing detailed description and drawings it is apparent I have invented a novel construction and combination whereby a needed improvement occurs in buffer construction and manufacture and installation that increase the factor of safety of pneumatic automobile wheels and makes economic production possible.

While certain representative embodiments and details have been shown for the purpose of illustrating the invention, it will be apparent to those skilled in the art that various changes and modifications may be made therein without departing from the spirit and scope of the invention. Therefore the detailed description of the particular embodiment of the invention illustrated and described herein is not to be construed as limiting the invention thereto. The invention includes all features of patentable invention and combination novelty residing in the foregoing description and the accompanying drawings.

I claim:

1. In a wheel consisting of a drop center rim and tubeless tire enclosing a buffer that braces one tubeless tire bead against rim tire bead seat displacement towards the rim center when swerves and other factors place sidewall pressure on the tire bead, a buffer characterized by having in combination construction of flexible material formed in novel unbroken ring shape with rectangle resembling cross section means, the least diameter of said ring being as great as the rim lateral half diameter adjacent the said braced tire bead, the greatest diameter of said buffer being less than the inside diameter of the enclosing tubeless tire cap, said buffer sufficiently narrow that approximately half of the rim drop center remains open for the unbraced tire bead final installation before tubeless tire inflation, said buffer having reinforcement means cemented to said buffer lesser diameter attachable for lateral stability exclusively to the rim structure on the side of the rim and drop center nearest the said tire laterally braced bead, said buffer having no lateral bracing against the ascending drop center radial wall and the rim tire bead seat and retaining flange opposite the braced tire bead, said buffer having no bolt attachment to the rim tire retaining flanges outside the tire whereby said rim is clear for final installation of the unbraced tire bead before tire inflation.

2. A buffer as in claim 1 further characterized by said rim attaching means consisting in combination of tire air-shield-like reinforcements embedded in said buffer that extend in tire air-shield-like manner under the inflated tire bead being braced against rim tire bead seat displacement whereby the entire tire bead stretched over the rim tire bead seat resists local sidewall bead swerve, rock or clay jamming displacement of the said tire bead towards the drop center of the rim.

3. A buffer as in claim 1 further characterized by said buffer attaching means consisting of a strong unshatterable angle clip means embedded in the lesser diameter of said buffer, said clip means being one or more in number and having means to attach said buffer by bolt means to a projection arising from the rim drop center and secure said buffer laterally to brace said braced tire bead from displacement from its rim seat towards the rim drop center.

4. A buffer as in claim 3 further characterized by combination of one or more bolt threaded bushings means constructed of unshatterable material means being imbedded in said buffer structure and accessible to bolting means from the side furtherest from said tire braced bead to which a complimentary buffer cap and sidewall means attach by said bolting means extending said buffer cap and sidewall over the open rim drop center and forming a holding means for radially and laterally holding tires whereby a buffer cap air tire having radially elongated bead walls means can be clamped between said buffer halves by said bolting means.

5. A buffer as in claim 4 further characterized by having in combination an air tire shield constructed of tire shield fabric and having tire shape resembling the novel combination of two question marks open ends facing each other to form a novel tire shape with the tire beads at the usual normal tire position and with said tire beads then elongated laterally towards each other to the approximate lateral center between said normal beads and composed of tire shield fabric and then said tire beads further elongated radially axleward side by side sufficiently to form tire bead walls enclosed between the split halves of said buffer by bolting means whereby said buffer cap tire is firmly held laterally and radially to said buffer cap when shock loads from road obstructions distort the shape of the said buffer as the lesser diameter of said tire radial bead walls is less than the lesser diameter of the buffer cap when distorted by shock loads encountered by said combination and thus said tire retains it buffer lateral and radial location.

6. A buffer combination as in claim 5 further characterized by said radially extending tire shield bead walls having surface means cemented together to an airtight fit, and said buffer cap tire having means to install a pneumatic valve to said buffer cap tire accessible to inflation either inside the enclosing tire or outside the tire rim combination as required for class of use.

7. A buffer as in claim 5 further characterized by having in combination an air tube with a valve inside said buffer cap tire beads and sidewalls and having inflation means accessible for inflation inside the enclosing tire and means for inflation outside the tire rim combination.

8. A buffer as in claim 3 further characterized by combination with a rim means and an enclosing tubeless tire to form a safety wheel.

9. A buffer cap tire for mounting on flexible material buffer caps and rims that are split in the approximate lateral center radially, said buffer cap tire constructed of airshield fabric in tire shape to the point of normal tire bead position, then said tire sidewalllike beads elongated laterally towards said normal tire bead positions to the approximate center between said normal tire bead positions and then said tire elongated radially axleward to lesser diameter forming a radially extending tire bead wall means clampable between said split buffer halves by bolting means.

10. A buffer cap tire as in claim 9 further characterized by clamp installation between the half sections means of a flexible circular buffer means that bolt together by means of a threaded bushing imbedded in one section of said buffer thus in combination forming a buffer with an air tire installed over the buffer cap said combination having tube means to retain air.

11. A product as in claim 10 further characterized by one of said buffer halves means having one or more unshatterable angle shaped means attached by cementing to the least diameter of said buffer half providing means to bolt attach said buffer section to a drop center rim projection means laterally securing said buffer half and enabling said buffer half least diameter to brace one enclosing tire bead against displacement from its rim bead seat towards the rim drop center when road swerves, clay jamming and hole encounter produces shock load on the enclosing tire sidewall.

12. A combination product as in claim 11 further characterized by attachment to a rim means and enclosed by a tubeless tire to form a high speed safety wheel.

* * * * *